(12) United States Patent
Van Camp

(10) Patent No.: US 7,672,100 B2
(45) Date of Patent: Mar. 2, 2010

(54) ELECTROSTATIC DISCHARGE PROTECTION STRUCTURES WITH REDUCED LATCH-UP RISKS

(75) Inventor: Benjamin Van Camp, Antwerp (BE)

(73) Assignee: Sofics BVBA, Gistel (BE)

( * ) Notice: Subject to any disclaimer, the term of this patent is extended or adjusted under 35 U.S.C. 154(b) by 294 days.

(21) Appl. No.: 11/751,750

(22) Filed: May 22, 2007

(65) Prior Publication Data

US 2008/0055804 A1 Mar. 6, 2008

Related U.S. Application Data

(60) Provisional application No. 60/808,041, filed on May 23, 2006.

(51) Int. Cl.
| | |
|---|---|
| H02H 9/00 | (2006.01) |
| H02H 3/20 | (2006.01) |
| H02H 9/04 | (2006.01) |
| H02H 3/22 | (2006.01) |
| H02H 1/00 | (2006.01) |
| H02H 1/04 | (2006.01) |
| H02H 9/06 | (2006.01) |
| H01C 7/12 | (2006.01) |

(52) U.S. Cl. ............ 361/56; 361/91.1; 361/111; 361/118

(58) Field of Classification Search ............ 361/56, 361/91.1, 111

See application file for complete search history.

(56) References Cited

U.S. PATENT DOCUMENTS 5,825,600 A * 10/1998 Watt ............................ 361/56
7,110,230 B2 * 9/2006 Van Camp et al. ............ 361/56

\* cited by examiner

*Primary Examiner*—Albert W Paladini
*Assistant Examiner*—Dharti Patel
(74) *Attorney, Agent, or Firm*—Lowenstein Sandler PC

(57) ABSTRACT

The present invention provides an ESD protection circuitry in a semiconductor integrated circuit (IC) having protected circuitry to prevent false triggering of the ESD clamp. The circuitry includes an SCR as an ESD clamp having an anode adapted for coupling to a first voltage source, and a cathode adapted for coupling to a second voltage source. The circuitry also includes at least one noise current buffer (NCB) coupled between at least one of a first trigger tap of the SCR and the first voltage source such that the first trigger tap of the SCR is coupled to a power supply.

17 Claims, 5 Drawing Sheets

ELECTROSTATIC DISCHARGE PROTECTION STRUCTURES WITH REDUCED LATCH-UP RISKS

CROSS-REFERENCE TO RELATED APPLICATIONS

This application claims the benefit of U.S. Provisional Application No. 60/808,041 filed on May 23, 2006, contents of which are incorporated herein by reference in its entirety.

FIELD OF THE INVENTION

This invention generally relates to the field of electrostatic discharge (ESD) protection circuitry and, more specifically, improvements in preventing false triggering of silicon controlled rectifier (SCR) circuits in the protection circuitry of the integrated circuit (IC).

BACKGROUND OF THE INVENTION

In the prior art, in order to prevent false triggering of the ESD clamp, the noise is modeled by voltage overshoots. For voltage overshoots, a Noise Voltage Buffer (NVB) is used as can be seen in FIG. 1. FIG. 1 shows a schematic block diagram of the prior art representing an ESD protection circuit 100 of an integrated circuit (IC). The ESD protection circuit 100 includes an ESD clamp, a SCR 102 coupled to a Node1 104 which represents a pad of the IC. The IC pad of Node1 104 may be an input pad, an output pad, or a supply pad. Node2 106 may be a ground or also an input/output pad. The triggering tap, G2 of the SCR 102 is coupled to Node3 108 which may be an input pad, an output pad or a supply pad. In this example of FIG. 1, Node1 104 represents an input pad, Node2 represents ground and Node3 108 represents a power supply. A Noise Voltage Buffer (NVB) 110 is coupled between the triggering tap G2 of the SCR 102 and Node3 108. A shunt resistor R1 112 is optionally coupled between the SCR 102 and the Node2 106.

During normal operation, Node3 108 is powered, however at Node1 104 the voltage is lower than the power supply, i.e. not enough voltage to conduct current between the anode and the grounded cathode. Thus, the SCR 102 is turned off. In order for SCR 102 to turn on there must be at least 0.7 volts between Node1 and G2 of the SCR 102. Because the input voltage, i.e. at Node1 104 is below the power supply, i.e. Node3 108, thus SCR 102 cannot trigger during normal operation. During ESD, the power supply at Node3 108 is essentially at 0 volts, however, the voltage at Node1 104 is high, i.e. at least 0.7 volts or higher, then there will be voltage over G2 anode junction, causing the SCR 102 to turn on or trigger. The ESD current will run through the SCR 102 from Node1 104 to Node2 106.

In a case scenario the input voltage at Node1 104 may become higher than the power supply, Node3 108 during normal operation. For example voltage at Node3 108 is 1.8 volts and voltage at Node1 102 is 2 volts or higher which can trigger the SCR 102 to turn on during normal operation. Normally the voltage at the input or output node 104 is limited below the power supply, but voltage overshoot (noise, spikes) can introduce these overvoltages. Thus, in this situation, SCR 102 is triggered not due to the ESD, but due to high voltage at the input pad, Node1 104. This is the false triggering of the SCR 102 which is not a desired application during normal operation. Thus, the NVB 110 will lower the voltage occurring between the anode and G2 by dividing the voltage in series. So, for example, the 0.7 volts at Node1, will be divided into 0.3 volts over the G2 anode junction and 0.3 volts over the NVB 110, thus limiting the voltage over the G2 anode junction. Therefore, NVB 110 prevents G2 from the triggering of the SCR 102 during normal operation, thus preventing that the voltage overshoot noise will trigger the SCR.

Although attempts have been made in the past to reduce the false triggering of the SCR by different circuit techniques, there still exist a danger for unwanted triggering of the device during normal supply line powered operation.

SUMMARY OF THE INVENTION

In one embodiment of the present invention, there is provided an electrostatic discharge (ESD) protection circuit in a semiconductor integrated circuit (IC) having protected circuitry. The ESD protection circuit comprise a first voltage source of a protected circuit node of the IC, a silicon control rectifier (SCR) having an anode adapted for coupling to the first voltage source, and a cathode adapted for coupling to a second voltage source. The circuit further comprises at least one noise current buffer (NCB) coupled between at least one of a first trigger tap of the SCR and the first voltage source, wherein the at least one of the first trigger tap of the SCR is coupled to a third voltage source.

DETAILED DESCRIPTION OF THE INVENTION

Figure 2:
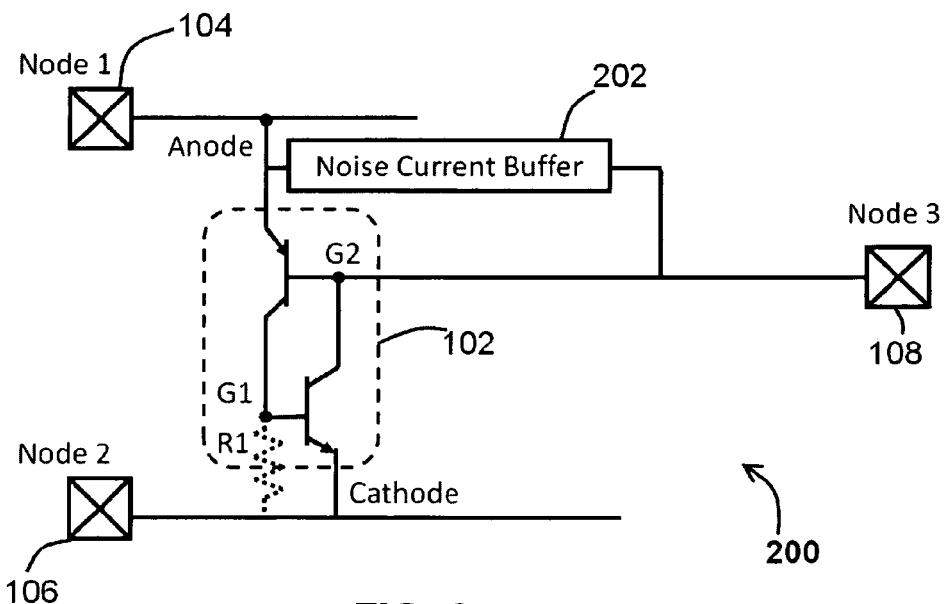
FIG. 2 depicts an illustration of a block diagram of an ESD protection circuit having a Noise Current Buffer in accordance with one embodiment of the present invention.

The present invention is modeled to prevent that the SCR will trigger due to uncontrolled current in the input of the ESD clamp during normal operation. Excessive current can cause latch-up if it is injected in the ESD clamp. When enough current flows into the anode-G2 junction of the SCR 102, the SCR 102 will trigger or turn on which is not ideal for the normal operation. This problem of false triggering of the SCR 102 during normal operation is solved by adding a Noise Current Buffer (NCB) 202 to the ESD protection circuit 200 as shown in FIG. 2. Note that the NCB 202 is placed in parallel with the trigger node of the ESD protection between the Anode-G2 junction of the SCR 102. So, the current is now divided into two parallel paths.

During normal operation, Node 3 108 is powered and the voltage at Node1 104 is between ground and the power supply. Injected current at Node1 104 will now flow mainly through the Noise current buffer (NCB) 202 and only a very small part will flow through the Anode G2 junction. This part is too small to trigger the SCR 102. The main part of the current can now flow towards Node3 108.

During ESD, which itself is a current injector, the current will flow through both the anode-G2 junction and the NCB 202, thus requiring more current to turn on the SCR 102 (since only the current flowing in anode-G2 junction will turn on the SCR 102). The Anode G2 junction of the SCR 102 can be designed to handle a certain amount/level of current during the triggering. Once the level of current is high enough, the SCR 102 will turn on. During normal operation, the current value ranges between 0 mA and 100-200 mA. However, during ESD, the current value can be high, ranging in 0 A and 2-3 A. Thus, a certain level of threshold in current value is provided for NCB 202. The threshold may range preferably from 0.1 A to 0.3 A. Below this current value the SCR 102 will not trigger, but if the injected current becomes higher than this value the SCR can trigger.

Figure 1:
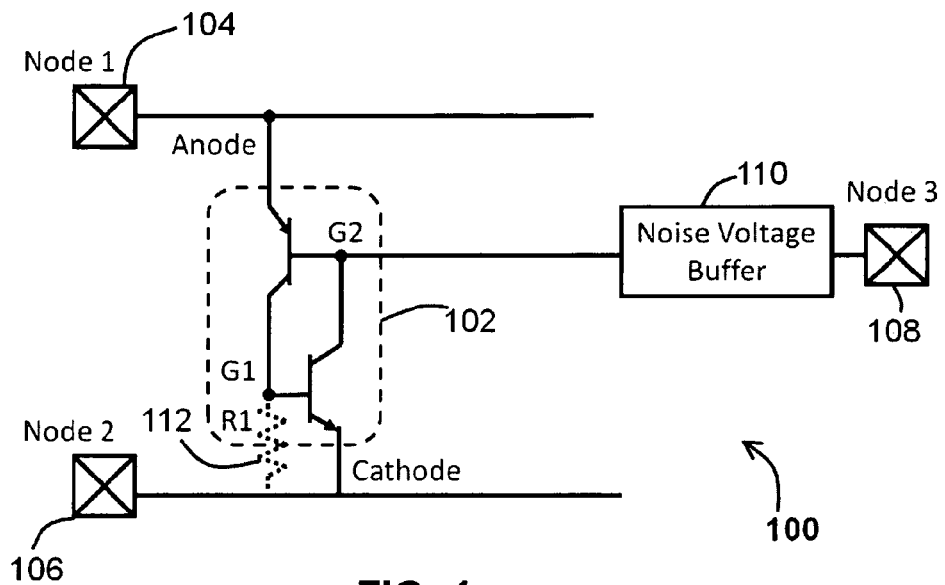
FIG. 1 depicts an illustration of a block diagram of a prior art implementation of an ESD protection circuit.
Figure 3:
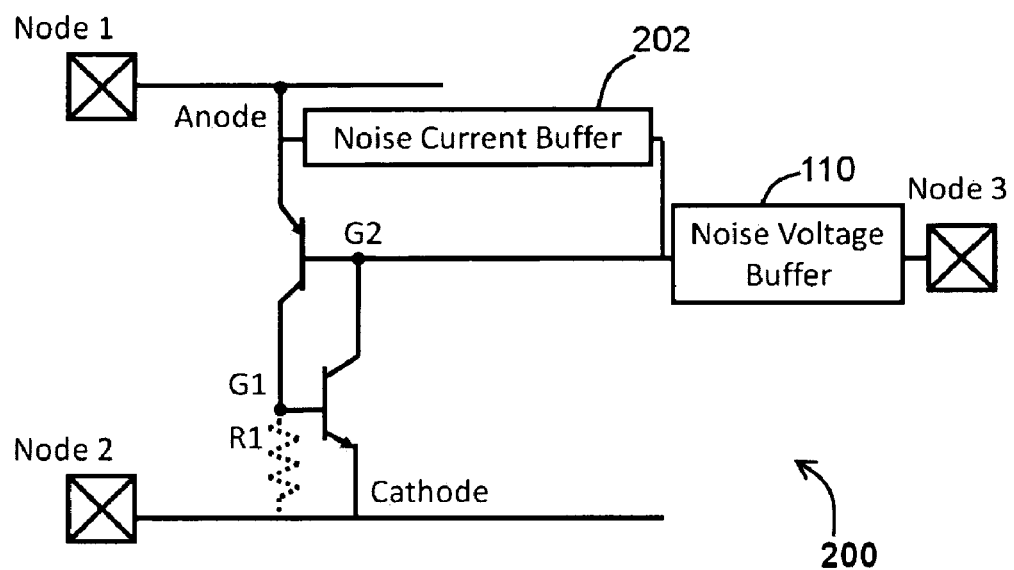
FIG. 3 depicts an illustration of a block diagram of the ESD protection circuit of FIG. 2 with a combination of a Noise Current Buffer and a Noise Voltage buffer in accordance with another embodiment of the present invention.

FIG. 3 depicts an illustration of a block diagram of the ESD protection circuit 200 of FIG. 2 with a Noise Voltage Buffer (NVB) 110 in accordance with another embodiment of the present invention. The advantage of using both techniques is that the ESD clamp can be made safely for voltage overshoots/noise and also for current overshoots/noise during normal operation. The operation of this circuit is the same as discussed above with respect to FIGS. 1 and 2

Since the NCB 202 might introduce high leakage current (undesirable leakage) between Node3 108 and Node1 104, a Leakage Buffer (LB) 204 may preferably be added to the ESD protection circuit of FIG. 2. The leakage buffer (LB) 204 will prevent the current flow between Node1 104 and Node3 108 during normal operation. The need of the LB 204 depends on the implementation of the noise current buffer, NCB 202, i.e. it depends if the NCB 202 is in conduction during normal operation. The LB 204 can be placed either in series with the ESD trigger node G2 as shown in one embodiment in FIG. 4A, or in parallel with the ESD trigger node G2 as shown in another embodiment in FIG. 4B.

Figure 4A:
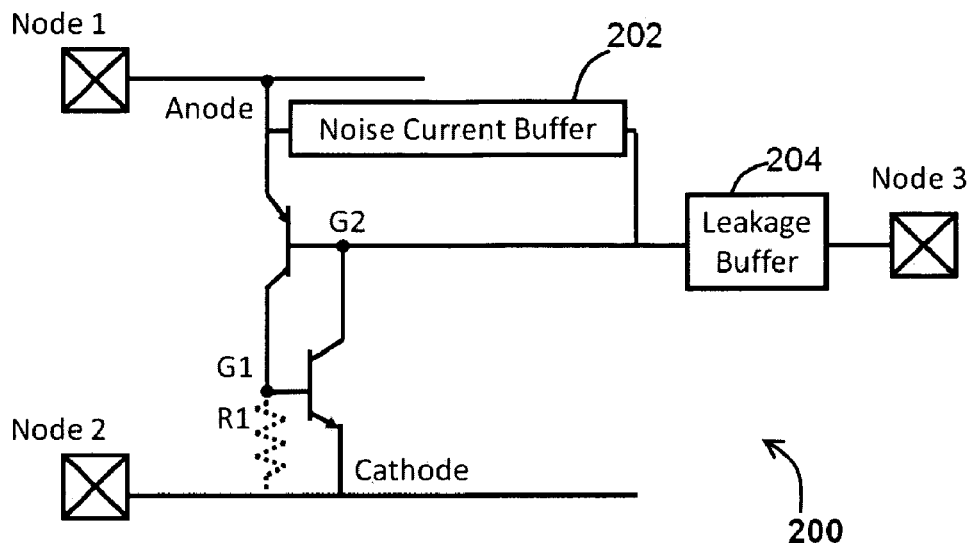
FIG. 4A depicts an illustration of a block diagram of FIG. 2 with a combination of Noise Current Buffer and Leakage Buffer in accordance with even further embodiment of the present invention.
Figure 4B:
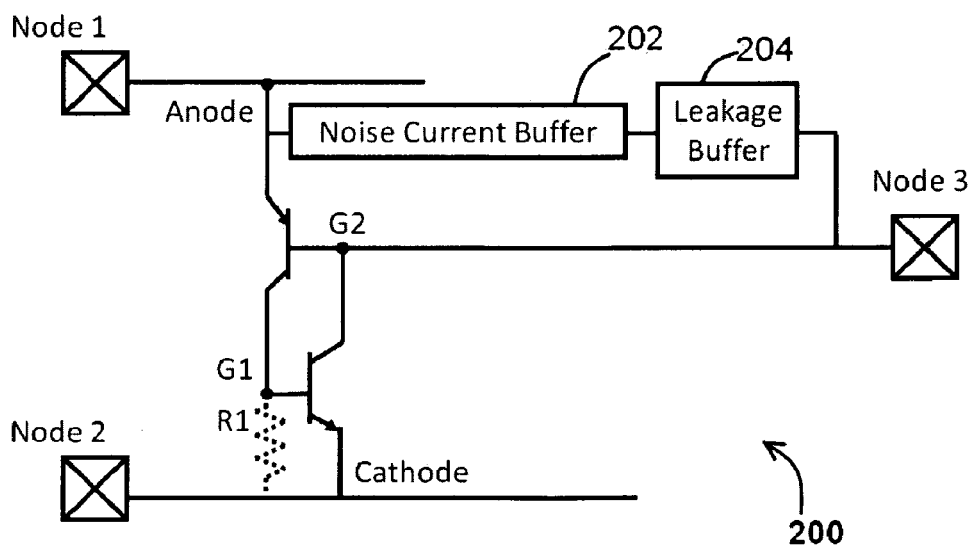
FIG. 4B depicts an illustration of a block diagram of FIG. 2 with a combination of Noise Current Buffer and Leakage Buffer in accordance with an alternate embodiment of the present invention.

The trigger voltage in FIG. 4A preferably comprise of 0.7 volts of G2-anode junction, plus the voltage over the LB 204 to conduct current. (The advantage of placing the leakage buffer (LB) 204 in parallel in FIG. 4B is that the trigger voltage during ESD does not include the voltage over the LB 204. This will give a clamp with a lower trigger voltage and so a better clamping device to protect Node1 104. Thus, trigger voltage in FIG. 4B is simply the 0.7 volts of G2-anode junction, since the LB 204 is not in series with the trigger node, G2, so the trigger voltage is much lower. Although, not shown, a NVB 110 can be connected between the trigger node G2 and the Node3 108 of the ESD protection circuit of FIG. 4A and FIG. 4B if extra protection is needed for voltage overshoots/noise.

Figure 4C:
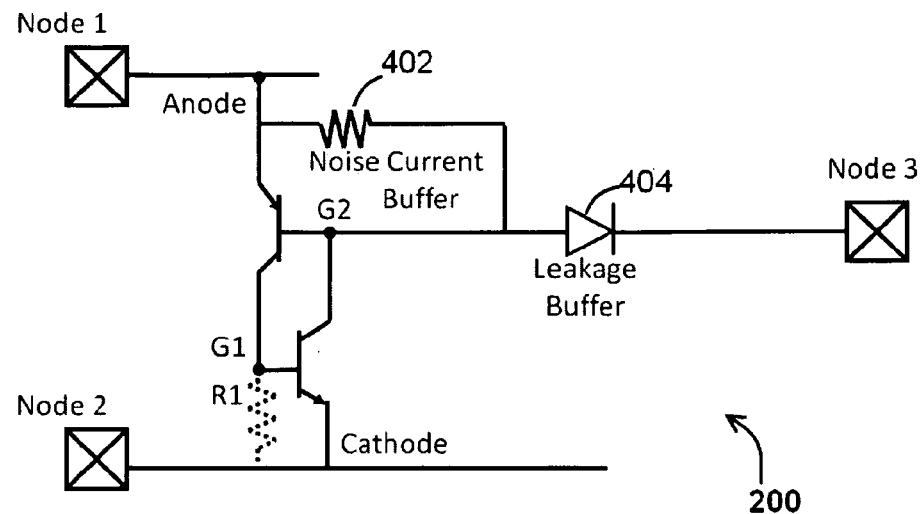
FIG. 4C depicts an illustration of an exemplary implementation of the Noise current Buffer and Leakage Buffer of FIG. 4A in accordance with a preferred embodiment of the present invention.
Figure 4D:
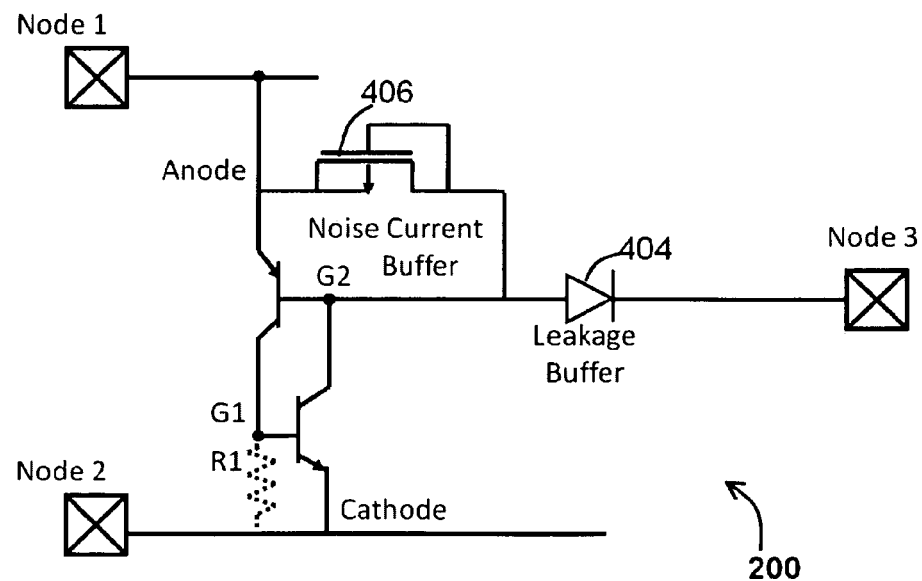
FIG. 4D depicts an illustration of an another exemplary implementation of the Noise current Buffer and Leakage Buffer of FIG. 4A in accordance with a preferred embodiment of the present invention.

Referring to FIG. 4C, there is show an exemplary implementation of the Noise Current Buffer (NCB) 202 and the Leakage Buffer (LB) 204 of FIG. 4A in accordance with a preferred embodiment of the present invention. In this embodiment, the NCB 202 consists of a resistor 402 and the LB 204 consists of a diode 404. Note that the Noise immunity is now $\sim 0.7V/R_{NCB}$. This value is the minimum current needed for triggering the SCR 102. If the maximum current is injected during normal operation if for example 100 mA, the needed resistance value for the resistor 402 can be calculated with the formula. This resistance value provides the certain level of threshold in current value for the NCB 202. Also, the diode 404 (acting as a leakage buffer 204) will prevent the current flow (i.e. the leakage current) between Node1 104 and Node3 108 when the resistor 402 is in conduction during normal operation Furthermore, FIG. 4D depicts an illustration of an another exemplary implementation of the Noise current Buffer (NCB) 202 and Leakage Buffer (LB) 204 of FIG. 4A in accordance with a preferred embodiment of the present invention. In this embodiment, the LB 204 consists of the diode 404 similar to FIG. 4C, however, the NCB 202 consists of an active element, NMOS 406. As shown in FIG. 4C, the source of the NMOS 406 is connected to the anode of the SCR 102 and the gate of the NMOS 406 is connected to its drain and the drain is further connected to G2-anode junction. Since the voltage at Node3 108 is smaller than the voltage at Node1 104 during ESD, the gate voltage of the NMOS is low, thus the NMOS 406 is turned off. When the NMOS 406 is turned off, it is highly resistive, i.e. a large amount of current will flow through the NMOS 406 which further flows into the anode-G2 junction, thus making it quite easy to turn on the SCR 102.

During normal operation, the voltage at Node3 108 is higher then the voltage at Node1 104, thus the sate voltage of NMOS 406 is high, which turns on the NMOS 406. When NMOS 406 is turned on, it is low ohmic, i.e. small amount of current will flow through it and into the anode-G2 junction. This low amount of current is not enough to trigger on the SCR 102, thus preventing the SCR 102 to turn on during normal operation. During normal operation the NMOS 406 is turned on, thus current will flow from Node3 10S to Node1 104. This leakage is undesirable, thus a LB 204 is needed to block this leakage. Which is in this case is a diode 404 During normal operation the diode is in reverse thus blocking the current flow from Node3 108 to Node1 104.

Although in the above examples of FIG. 4C and FIG. 4D, the NCB 202 is illustrated as a resistor and NMOS respectively, and LB 204 is shown as diodes, it is important to note, that in general they can consist of any active elements such as NMOS, PMOS, bipolar transistor, diode, or passive elements such as resistor, metal, inductor, capacitor. Thus, the scope of the invention is not limited to the use of a specific element as NCB and LB.

Figure 5A:
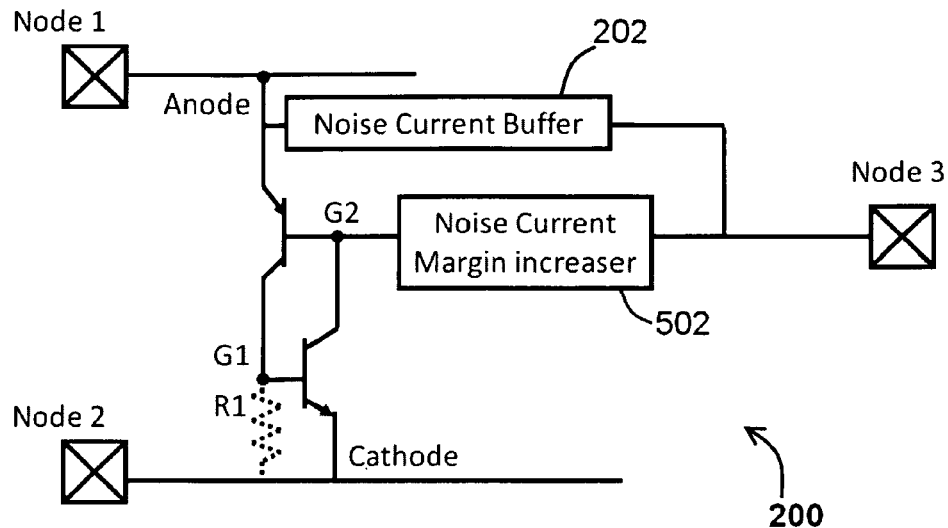
FIG. 5A depicts an illustration of a block diagram of FIG. 2 with a combination of Noise Current Buffer, and Noise Current Margin Increaser in accordance with an alternate embodiment of the present invention.

Since the ESD clamp is an SCR 102 in the embodiments as shown above, the NCB 202 must work below 0.7V (25° C.) to avoid triggering of the clamp. However, in order for the SCR 102 to trigger, it requires at least 0.7V and higher. Thus, another element such as Noise Current Margin Increaser (NCMI) 502 is added to the ESD protection circuit as shown in FIG. 5A if the NCB 202 works during normal operation above 0.7V. The Noise Current Margin Increaser (NCMI) 502 is added to increase the voltage design space of the NCB 202. The NCMI 502 is placed in parallel with the NCB 202. If the NCB 202 is a resistor, for example, a large resistor, the trigger voltage can be increased by the NCMI 502. The voltage over the NCB 202 would be 0.7 volts plus the voltage over the NCMI 502. Thus, more current injected voltage is now required to trigger the SCR 102. This way by adding NCMI 502, the NCB 202 for example as a resistor can preferably have a higher value and the latch-up immunity will be the same (same current as in previous cases). With the same current injected the voltage over NCB 202 will be higher, but the clamp, SCR 102 will not trigger because the extra voltage will be over the NCMI 502 and not over the Anode-G2 junction. Although, not shown in FIG. 5A, the LB 204 may be preferably be placed either in parallel or in series with the NCMI 502. Similarly, the NVB 110 may desirably be placed in series with the NCMI 502.

Figure 5B:
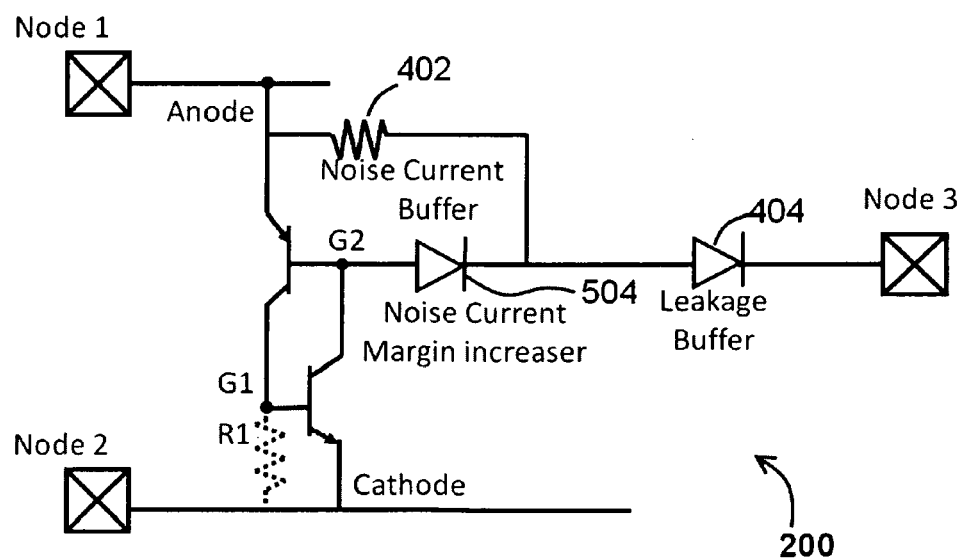
FIG. 5B depicts an illustration of an exemplary implementation of the Noise Current Buffer, and Noise Current Margin Increaser of FIG. 5A and the Leakage Buffer in accordance with a preferred embodiment of the present invention.

Referring to FIG. 5B, there is illustrated an exemplary implementation of the Noise Current Buffer, and Noise Current Margin Increaser of FIG. 5A with the addition of the LB 204 in accordance with a preferred embodiment of the present invention. In this embodiment, the NCB 202 consists of a resistor 402, the LB 204 consists of a diode 404 and the NCMI 502 also consists of a diode 504. Note that the noise immunity (maximum current) is now $\sim 1.4V/R_{NCB}$. This value is doubled compared to the build in voltage (0.7V) of the diode 404 in the circuit of FIG. 4C without the NCMI 502. This is especially useful for high temperature applications, since the diode built-in voltage drops for higher temperatures (~0.4V for 100° C.), and therefore the voltage design space drops.

Although in the given example of FIG. 5B, the NCMI 502 and LB 204 are shown as diodes, it is important to note, that in general they can consist of any active elements such as NMOS, PMOS, bipolar transistor, diode, or passive element such as resistor, metal, inductor, capacitor. Thus, the scope of the invention is not limited to the use of a specific element as NCMI and LB.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. An electrostatic discharge (ESD) protection circuit in a semiconductor integrated circuit (IC) having protected circuitry, the ESD protection circuit comprising:
    a first voltage source of a protected circuit node of the IC;
    a silicon control rectifier (SCR) having an anode adapted for coupling to the first voltage source, and a cathode adapted for coupling to a second voltage source; and
    at least one noise current buffer (NCB) coupled between at least one of a first trigger tap of the SCR and the first voltage source, said at least one of the first trigger tap of the SCR is coupled to a third voltage source.

2. The ESD protection circuit of claim 1 wherein said NCB functions to prevent triggering of the SCR during normal operation.

3. The ESD protection circuit of claim 1 wherein said NCB is a resistor.

4. The ESD protection circuit of claim 1 wherein said NCB is a MOS transistor.

5. The ESD protection circuit of claim 1 wherein said third voltage source is a power supply.

6. The ESD protection circuit of claim 1 wherein said second voltage source is a ground.

7. The ESD protection circuit of claim 1 further comprising a leakage buffer (LB) coupled between the NCB and the third voltage source.

8. The ESD protection circuit of claim 7 wherein said LB functions to prevent the current flow between the first voltage source and the third voltage source during normal operation.

9. The ESD protection circuit of claim 7 wherein said LB is coupled in series between the at least one of the first trigger tap of the SCR and the third voltage source.

10. The ESD protection circuit of claim 7 wherein said LB is coupled between NCB and first trigger tap of the SCR in parallel with said at least one of the first trigger tap of the SCR and the first voltage source.

11. The ESD protection circuit of claim 7 wherein said LB is a diode.

12. The ESD protection circuit of claim 11 wherein said diode is coupled in reverse from third voltage source and the NCB.

13. The ESD protection circuit of claim 1 further comprising a noise current margin increaser (NCMI) coupled in series with said at least one of the first trigger tap of the SCR and the third voltage source.

14. The ESD protection circuit of claim 13 wherein said NCMI functions to increase the voltage design space of the NCB.

15. The ESD protection circuit of claim 13 wherein said NCB is coupled in parallel with the NCMI.

16. The ESD protection circuit of claim 13 wherein said NCMI is a diode.

17. The ESD protection circuit of claim 1 further comprising a noise voltage buffer (NVB) coupled between said at least one of the first trigger tap of the SCR and the third voltage source.

* * * * *